Figure 10:
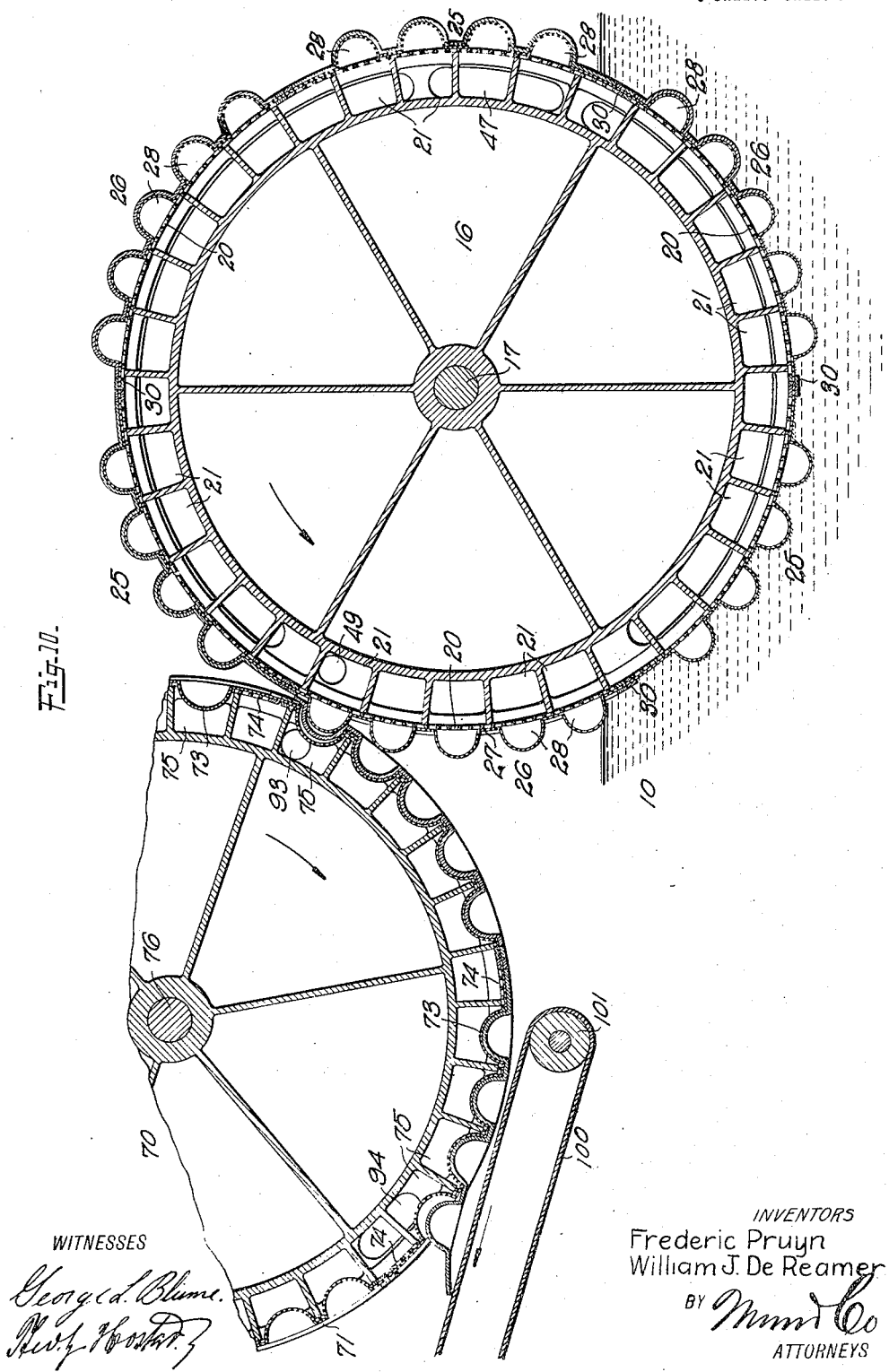

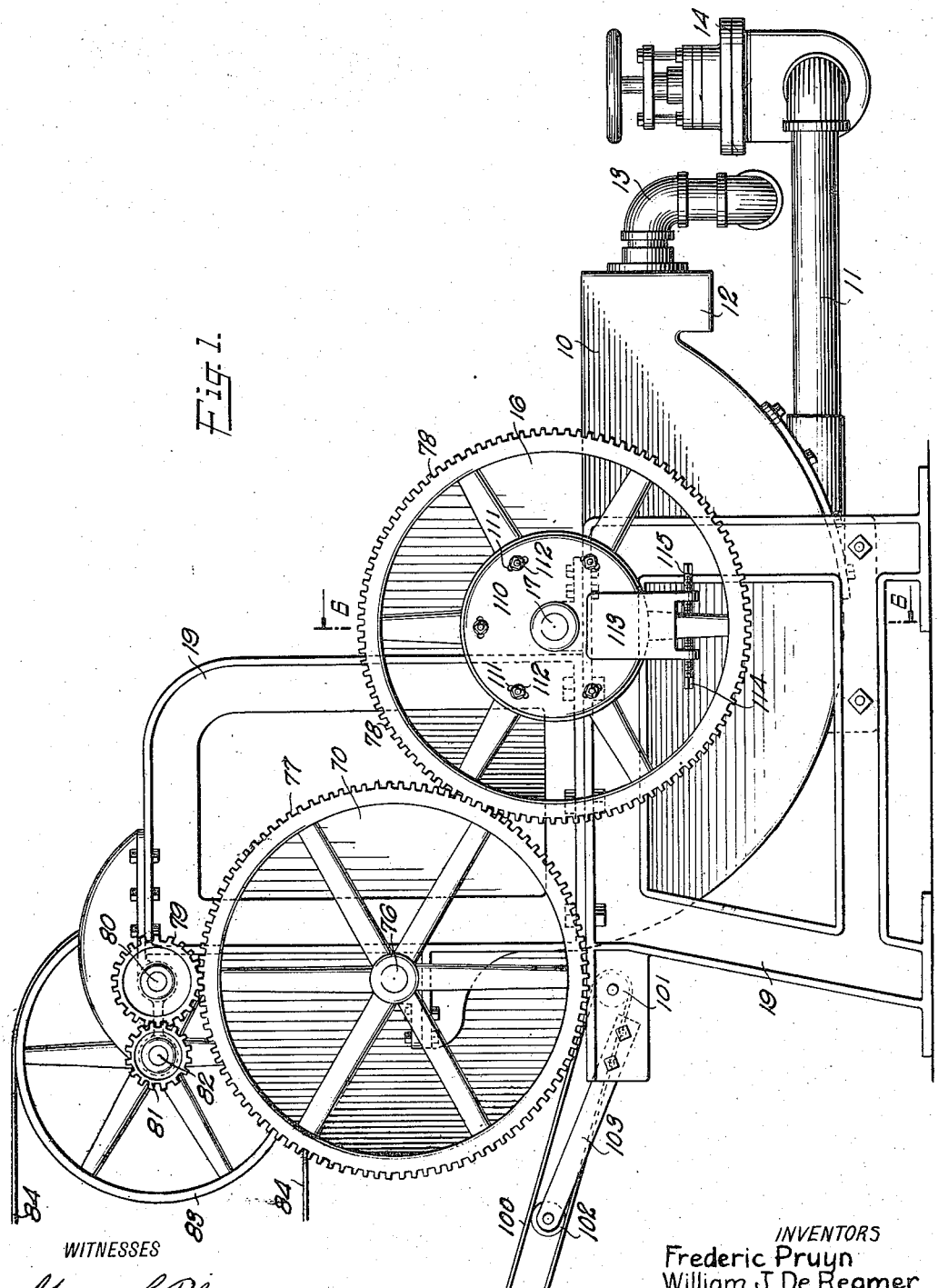

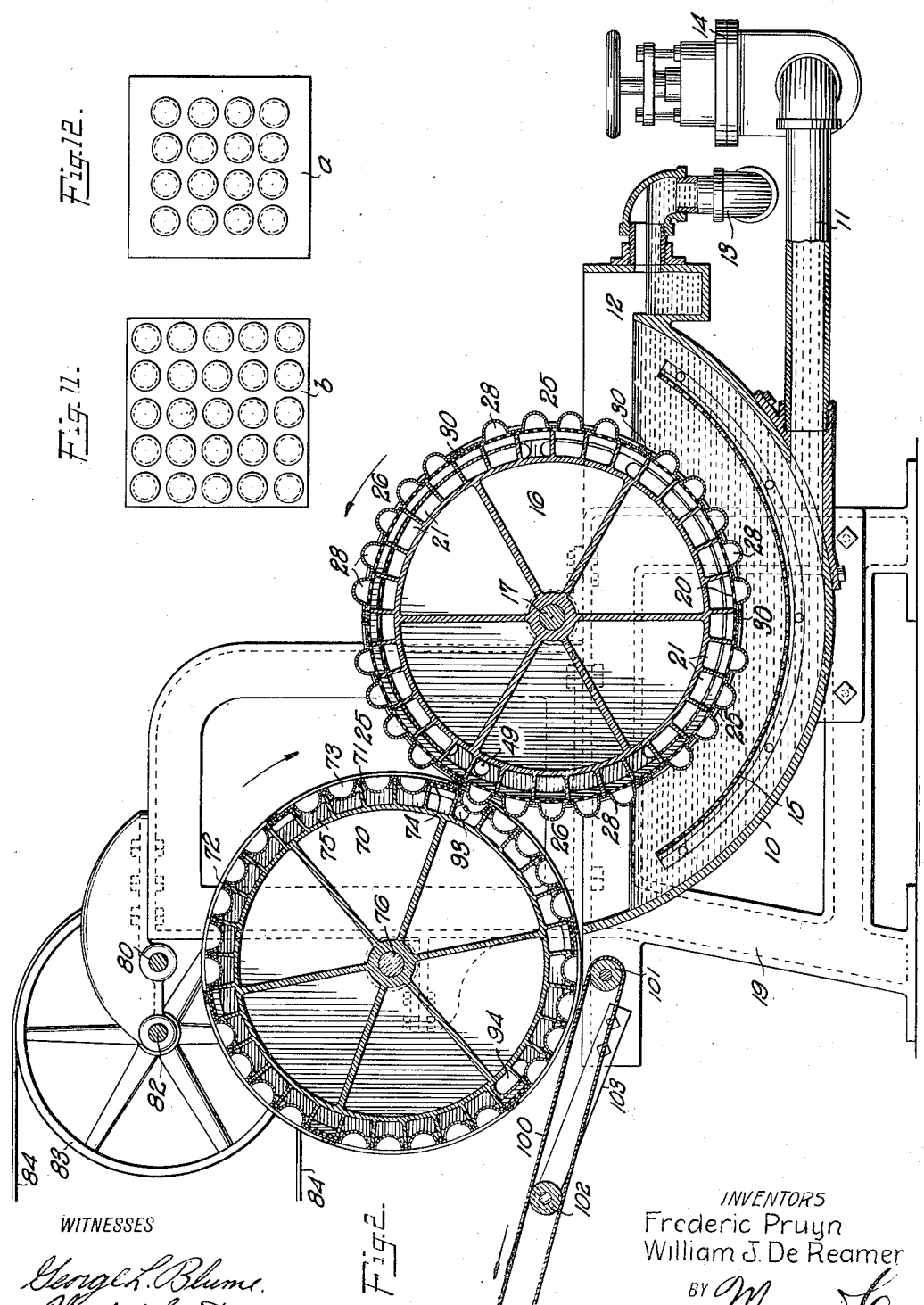

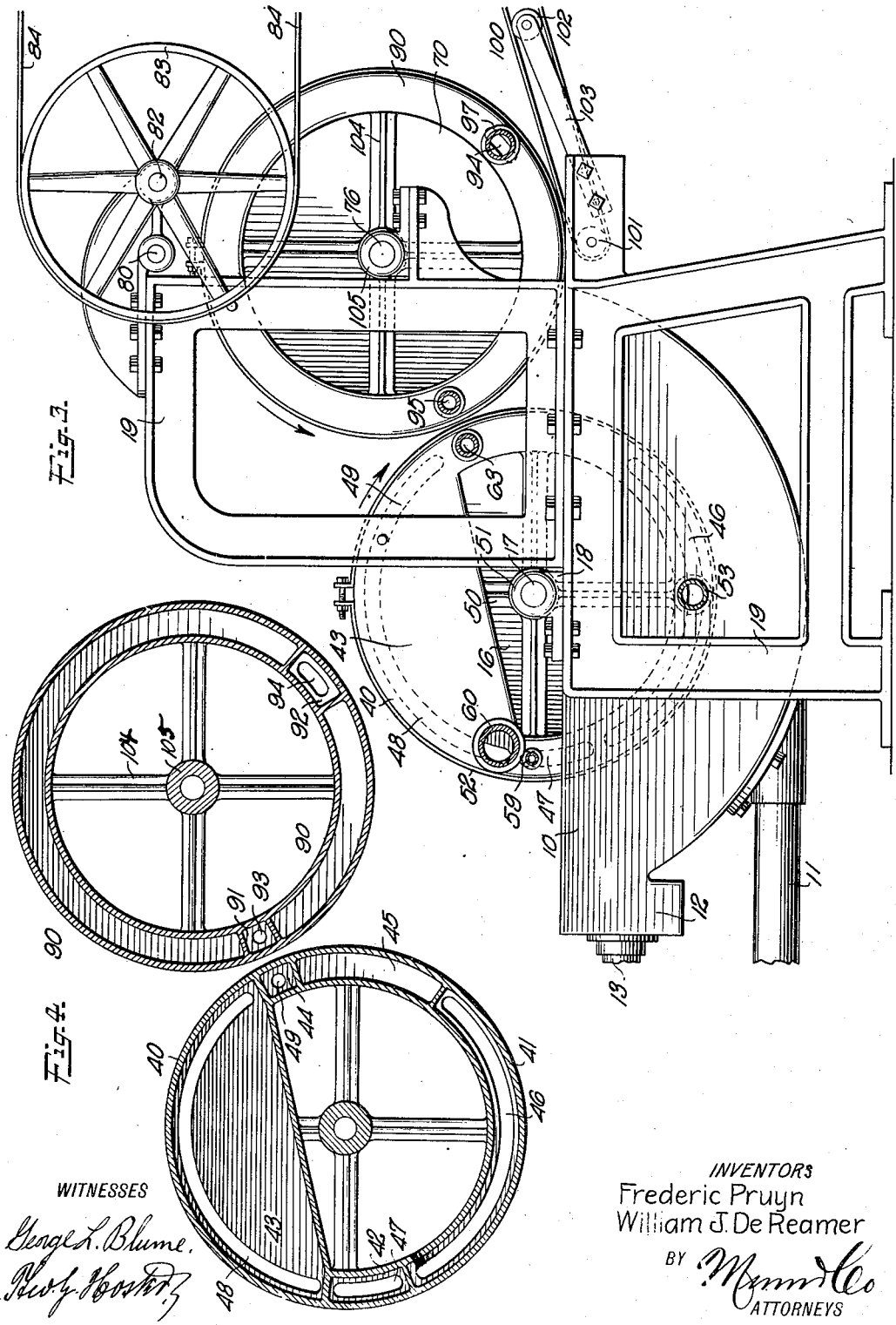

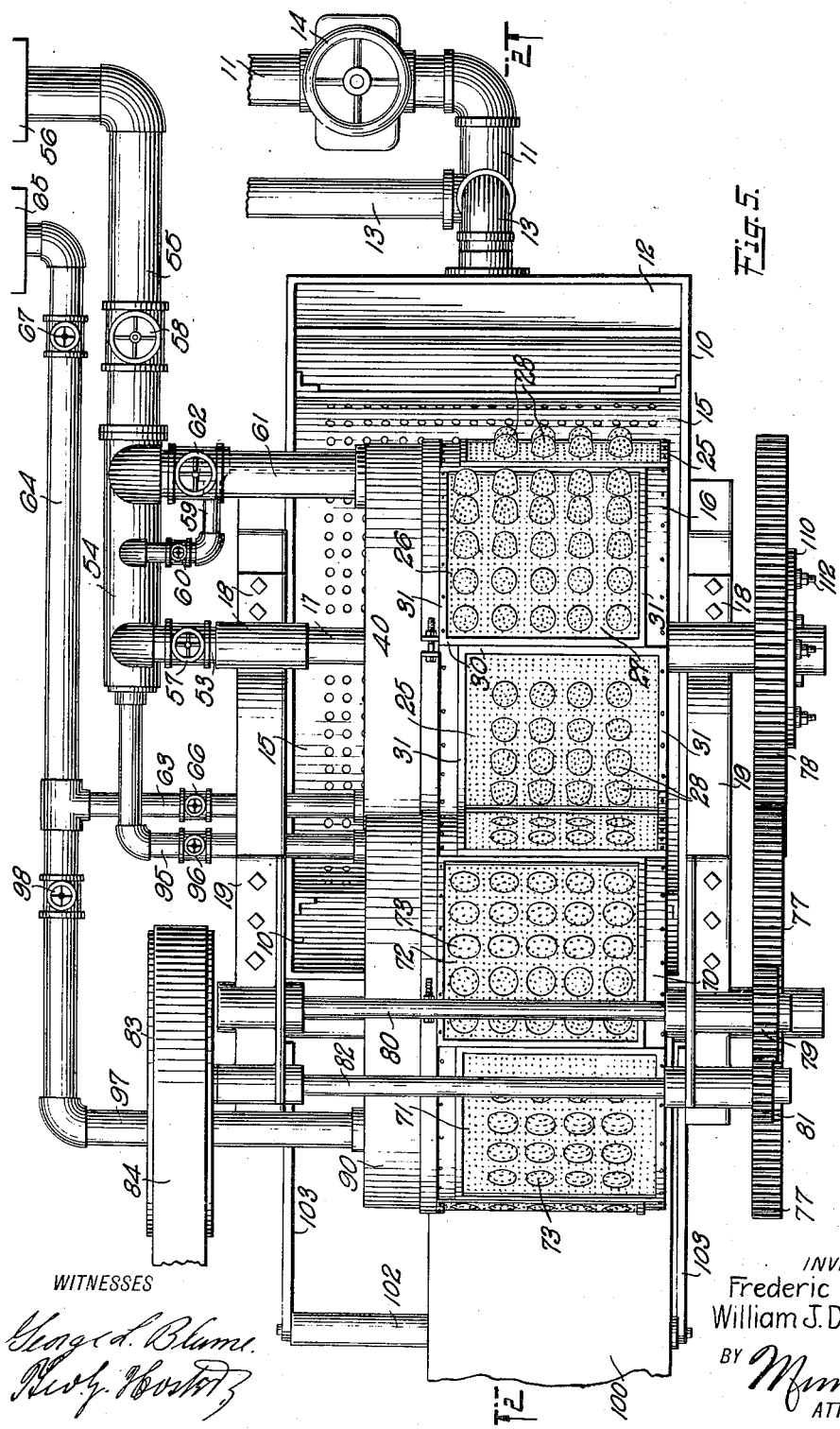

F. PRUYN & W. J. DE REAMER.
MACHINE FOR MAKING ARTICLES FROM PULP.
APPLICATION FILED DEC. 17, 1915.
1,211,229.
Patented Jan. 2, 1917.
6 SHEETS—SHEET 5.
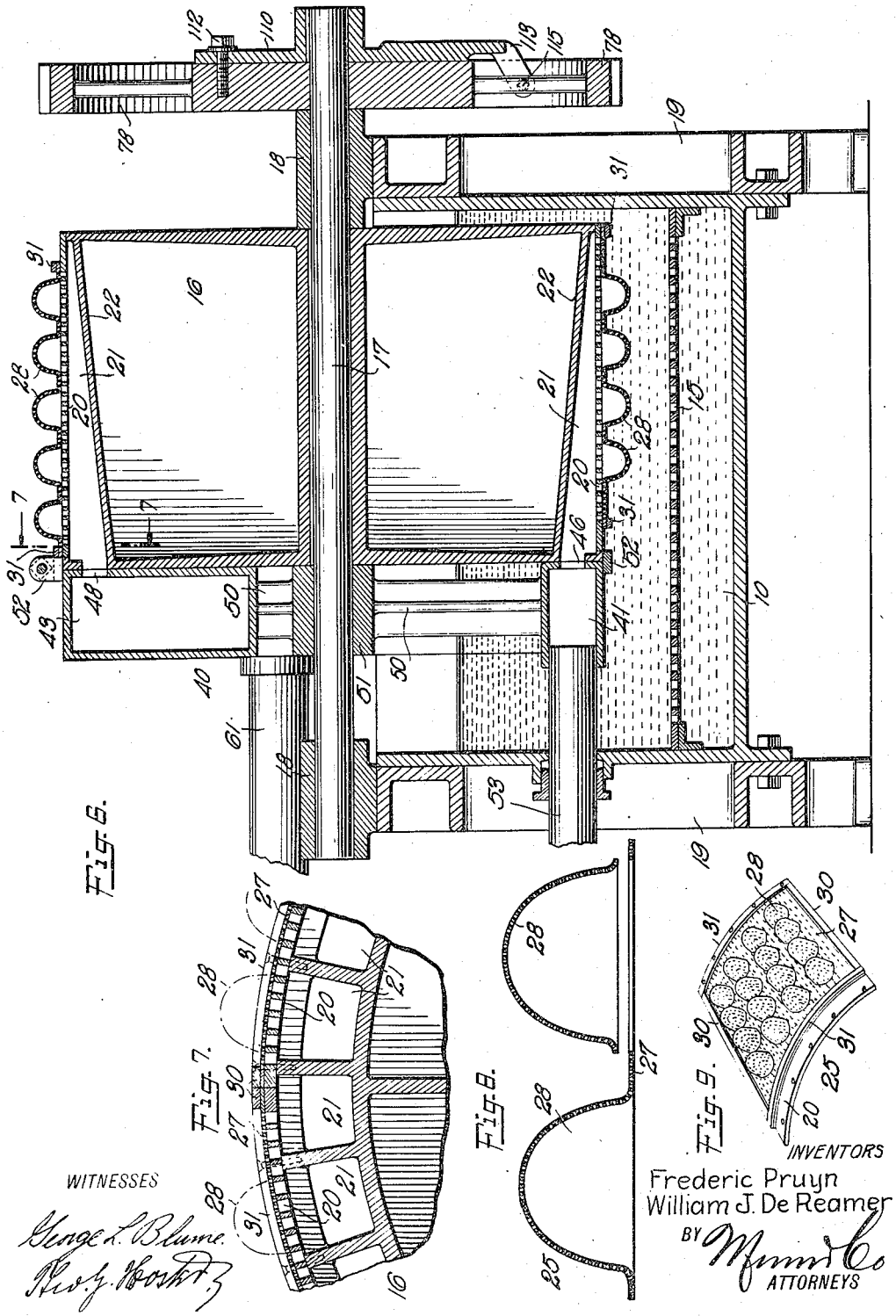
WITNESSES
INVENTORS
Frederic Pruyn
William J. De Reamer
BY
ATTORNEYS F. PRUYN & W. J. DE REAMER.
MACHINE FOR MAKING ARTICLES FROM PULP.
APPLICATION FILED DEC. 17, 1915.

1,211,229.

Patented Jan. 2, 1917.
6 SHEETS—SHEET 6.

WITNESSES
George L. Blume.

INVENTORS
Frederic Pruyn
William J. De Reamer
BY
ATTORNEYS

UNITED STATES PATENT OFFICE.

FREDERIC PRUYN, OF ALBANY, NEW YORK, AND WILLIAM J. DE REAMER, OF VERONA, NEW JERSEY, ASSIGNORS TO SEAMLESS PRODUCTS CORPORATION, OF EAST ORANGE, NEW JERSEY, A CORPORATION OF NEW YORK.

MACHINE FOR MAKING ARTICLES FROM PULP.

1,211,229.  Specification of Letters Patent.  Patented Jan. 2, 1917.

Application filed December 17, 1915. Serial No. 67,391.

*To all whom it may concern:*

Be it known that we, FREDERIC PRUYN and WILLIAM J. DE REAMER, both citizens of the United States, and residents, respectively, of Albany, in the county of Albany and State of New York, and of Verona, in the county of Essex and State of New Jersey, have invented a new and Improved Machine for Making Articles from Pulp, of which the following is a full, clear, and exact description.

The object of the invention is to provide a new and improved machine for making egg case fillers and other articles from pulp, and which is simple and durable in construction and arranged to allow of running the machine at a comparatively high speed with a view to economically turn out a large number of the articles in a given time and requiring little attention on the part of the attendant.

In order to accomplish the desired result, use is made of a pulp vat, a revoluble molding drum extending with its lower portion into the pulp in the said vat, the said molding drum being provided on its peripheral face with perforate molds and being provided with chambers in communication with the under side of the said molds, a fixed head on one end of the said molding drum and having separate suction chambers adapted to register successively with the said drum chambers, and means for producing varying suction pressures in the said suction chambers to suck the pulp onto the molds to form the articles and deprive the same of moisture, to hold each article in position on its mold and against distortion as it emerges out of the pulp in the vat and to finally subject the article to a heavy suction action for drawing off most of the remaining moisture in the article.

A practical embodiment of the invention is represented in the accompanying drawings forming a part of this specification, in which similar characters of reference indicate corresponding parts in all the views.

Figure 1 is a side elevation of the machine for making articles from pulp; Fig. 2 is a sectional side elevation of the same, on the line 2—2 of Fig. 5; Fig. 3 is a rear side elevation of the same with the pressure and suction pipes in section; Fig. 4 is a rear sectional side elevation of the heads for the molding drum and the transferring drum; Fig. 5 is a plan view of the machine for making articles from pulp; Fig. 6 is an enlarged cross section of the same on the line 6—6 of Fig. 1; Fig. 7 is an enlarged sectional side elevation of a portion of the molding drum; Fig. 8 is an enlarged sectional side elevation of a portion of a mold with one of the cup-shaped cells shown detached; Fig. 9 is a perspective view of one of the mold units; Fig. 10 is an enlarged sectional side elevation of the two drums, the vat and conveyer belt with the articles produced in position; and Figs. 11 and 12 are plan views of the egg case fillers produced by the machine.

In machines for making articles from pulp as heretofore constructed the pulp was sucked onto the peripheral perforate face of the drum to form an endless web subsequently subjected to a compression action and finally divided into the single article to be produced. In the machine presently to be described in detail, the articles are produced singly in rapid succession and rendered complete at each revolution of a revoluble molding drum and without requireing any compressive action whatever, it being sufficient to suck the pulp directly from the vat onto the molds of the molding drum, to then hold the formed article on the drum during its exit out of the pulp to prevent distortion of the green article and to then deprive each article of the major portion of the moisture to form a sufficiently strong structure to warrant its transfer to a transferring means, from which the article is finally delivered to a conveyer to be carried through a final drying apparatus. The machine, by a change in the form of the molds, can be used for making a variety of articles from the pulp, but the molds shown are especially designed for making nesting egg case fillers, such as shown in Figs. 10 and 11. The fillers *a, b* produced are all of the same size but one has sixteen cup-shaped cells and a wide margin while the next following filler is provided with twenty-five cup-shaped cells and with a very narrow margin, the cells of the two fillers being spaced in such relation to permit of properly nesting the fillers.

The pulp vat 10 is provided at its bottom with a supply pipe 11 for supplying the vat with a pulp mass, that is, pulpy material suspended in water, and the said vat is provided with an overflow 12 and a pipe 13 for carrying off the overflow pulpy mass. The supply of the pulpy mass to the vat 10 is regulated by a manually controlled valve 14 in the supply pipe 11 to maintain the pulpy mass practically at a constant level in the pulp vat 10. A perforate segmental baffle plate 15 is arranged in the bottom portion of the pulp vat 10 to break the force of the inflow of the pulpy mass by way of the supply pipe 11. Into the pulp mass contained in the vat 10 extends the lower portion of a molding drum or molding cylinder 16 having a shaft 17 journaled in suitable bearings 18 arranged on the main frame 19 on which the machine is mounted. The rim of the drum 16 is formed by segmental rim plates 20 bolted or otherwise fastened in place and having large perforations opening into chambers 21 formed along the rim of the drum directly under the rim plates 20, each drum chamber 21 extending from one end of the drum 16 to the other end thereof. The bottom 22 of each chamber 21 is inclined inwardly from the front end of the drum to the rear end thereof, as plainly shown in Fig. 6, to gradually reduce the chamber 21 with a view to provide a uniform suction action and a uniform air pressure within each chamber, as hereinafter more fully explained. The inclined bottom 23 also insures a ready outflow of the water from the chamber whenever the latter reaches an uppermost position during the rotation of the drum 16.

The perforate rim plates 20 of the drum 16 are overlaid with alternating perforate molds 25 and 26 each having a perforate foundation plate 27 and perforate inverted cup-shaped cells 28, the foundation plates 27 being preferably soldered to the rim plates 20, but other fastening means may be employed. The cells 28 of both molds 25 and 26 are arranged in transverse and longitudinal rows and the cells 28 of both molds are preferably alike in size and shape and are spaced symmetrically apart in the same relation. In order to make the egg case fillers shown in Figs. 9 and 10 the cells 28 on each mold 25 are arranged in four transverse and four longitudinal rows, thus making sixteen cells for each mold 25, and the mold 26 is provided with five transverse and five longitudinal rows of cells 28, thus making twenty-five cells for each mold 26. The four longitudinal rows of cells 28 of the mold 25 are in longitudinal alinement with four of the longitudinal rows of cells 28 of the mold 26, as plainly indicated in Fig. 5. The foundation plates 27 for both molds 25 and 26 are alike in size but owing to the less number of cells on the mold 25 the foundation plate thereof has wider margins in comparison to the very narrow margins of the foundation plate 27 of the mold 26. The perforations in the foundation plates 27 and their cells 28 are minute, and in practice each foundation plate and its cells are made separately (see Fig. 8), that is, each foundation plate is provided with apertures into which fit short flanges on the bases of the separately formed cells 28, the flanges being soldered or welded to the walls of the apertures in the foundation plates, as will be readily understood by reference to said Fig. 8. Most of the minute perforations of a foundation plate 27 are in register with the large perforations of the rim plates 20 and the opening of each cell 28 encompasses a large number of perforations in the rim plates 20. Each mold 25 and 26 is encompassed by a number of drum chambers 21, the arrangement being preferably such that a drum chamber 21 encompasses a corresponding portion of the mold having a transverse row of cells 28, and another drum chamber 21 encompasses adjacent ends of successive molds 25 and 26, as will be readily understood by reference to Figs. 2, 7 and 9. The adjacent edges of successive rim plates 20 and the foundation plates 27 attached thereto abut, as plainly indicated in Figs. 2, 7 and 9, and the margin of each foundation plate is overlaid by non-perforate transverse and longitudinal strips 30 and 31 soldered or otherwise fastened to the foundation plate 27. The strips 30 and 31 cover up the perforations along the margin of a foundation plate 27 to prevent all suction action along the margin of each mold 25 or 26, the strips 30 and 31 forming a raised frame on each foundation plate 27, thus providing a boundary for the pulp material drawn onto each mold. By the use of this frame 30, 31 the size of the article is defined and the formation of individual articles is insured.

From the foregoing it will be seen that the rim plate, its mold and the boundary frame form a unit which can be readily removed from the drum for repairs or other purposes and quickly replaced by another whenever it is desired to do so (see Fig. 9).

The molding drum is open at its ends, and on one end, preferably the rear end, is arranged a stationary head 40 provided with chambers 41, 42, 43, 44 and 45, of which the chambers 41, 42 and 43 are suction chambers, the chamber 44 is a compression chamber and the chamber 45 is a spacing chamber and extends between the chambers 41 and 44, as plainly indicated in Fig. 4. The chambers 41, 42, 43 and 44 are provided at their forward walls with ports 46, 47, 48 and 49 in register with the rear ends of the molding drum chambers 21 (see Fig. 6). The head 40 is provided with spokes 50, connected with a hub 51 through which extends loosely the shaft 17 to hold the head 40 properly centered relatively to the drum 16. A split clamping band 52 is attached to the peripheral face of the head 40 and extends over onto the peripheral face of the drum 16 to cover up the joint between the drum 16 and its head 40 with a view to avoid leakage. The ports 46, 47 and 48 are preferably segmental and the port 46 of the bottom suction chamber 41 extends below the level of the pulp in the vat 10 except at the right-hand end thereof which slightly rises above the level of the pulp, as plainly indicated in Fig. 2. The port 47 of the suction chamber 42 is located above the level of the pulp in the vat 10 and is comparatively short relatively to the ports 46 and 48. The port 48 extends from slightly above the horizontal center plane of the head 40 to a distance beyond the top thereof, as plainly indicated in Fig. 4, and the port 49 of the compression chamber 44 is preferably circular and is located above the level of the pulp in the vat 10. A suction pipe 53 is connected with the bottom of the suction chamber 41 and connects with a manifold 54 connected by a pipe 55 with a suction pump 56 or other similar suction device for producing a suction in the chamber 41. The pipe 53 is provided with a valve 57 to permit of controlling the amount of the suction in the chamber 41 with a view to regulate the thickness of the article to be made, as hereinafter more fully explained. A shut-off valve 58 is arranged in the pipe 55. A small suction pipe 59 connects the suction chamber 42 with the manifold 54 and this suction pipe 59 is provided with a valve 60 for controlling the amount of suction in the chamber 42. The chambers 41, 42, 44 and 45 are preferably segmental, and the bottom of the suction chamber 43 is inclined upwardly from the top of the chamber 42 to the top of the chamber 44, as plainly shown in Fig. 4, to readily drain all the water passing through the port 48 into the said chamber 43 to the lower end thereof. From this lower end of the chamber 43 leads a suction pipe 61 to the manifold 54 and this pipe 61 is provided with a valve 62 for controlling the amount of suction in the chamber 43. In practice, the pipes 53, 59 and 61 are so proportioned that the heaviest suction is had in the chamber 43 (say about 15 inch), a lighter suction is had in the chamber 41 (say about 10 inch), and a very light suction is had in the chamber 42 (say 2 inch). The compression chamber 44 of the head 40 is connected by a blast pipe 63 with a pipe 64 connected with a compressor or similar means for forcing a fluid, preferably air, under pressure into the chamber 44. The pipe 63 is provided with a regulating valve 66 and a shut-off valve 67 is arranged in the pipe 64.

A transferring drum 70 coacts with the molding drum 16 to transfer the articles from the molds 25, 26 to perforate plates 71, 72 arranged alternately on the peripheral face of the transferring drum 70. The plates 71, 72 are provided with perforate cup-shaped depressions 73 registering with the cells 28 of the corresponding molds 25 and 26, as plainly indicated in Fig. 2. The plates 71 are similar to the foundation plates 27 and are soldered or otherwise fastened to perforate rim plates 74 similar to the rim plates 20 and fastened by bolts or other means to the peripheral face of the drum 70. Each transverse row of depressions 73 of each plate 71 or 72 extends into a chamber 75 formed on the drum 70 and similar to the chambers 21. The drum 70 is attached to a shaft 76 journaled in suitable bearings on the main frame 19 of the machine, and in order to rotate the drums 16 and 70 in unison, use if made of gear wheels 77 and 78 in mesh with each other and of which the gear wheel 77 is secured to the shaft 76 and the gear wheel 78 is adjustably secured to the shaft 17, as hereinafter more fully described. The gear wheel 77 is in mesh with a pinion 79 secured to a shaft 80 journaled in suitable bearings in the upper portion of the main frame 19. The pinion 79 is also in mesh with a pinion 81 secured on one end of a driving shaft 82 likewise journaled on the main frame 19 and carrying a pulley 83 connected by a belt 84 with other machinery for imparting a continuous rotary motion to the shaft 82 which by the pinions 81 and 79 imparts a continuous rotary motion to the gear wheel 77 in mesh with the gear wheel 78 so that the two drums 16 and 70 are rotated in unison in the direction indicated by the arrows shown in the drawings.

The transferring drum 70 is open at both ends and on one end, preferably the rear end, is arranged a stationary head 90 provided with a suction chamber 91 located directly opposite the compression chamber 44 in the head 40 (see Fig. 4), and the head 90 is also provided with a compression chamber 92 shaped a distance from the suction chamber 91. The chambers 91 and 92 are provided with ports 93, 94, of which the port 93 is circular and is adapted to register with successive chambers 75 during the rotation of the drum 70 to produce a suction action in the registering chamber 75 and consequently on the corresponding portion of the plate 71 and the transverse row of depressions 73 thereof. The port 94 is elongated and is of such length that it encompasses somewhat more than one chamber 75 at a time, as plainly indicated in Fig. 2.

The chamber 91 is connected by a suction pipe 95 with the manifold 54 previously mentioned, and the said suction pipe 95 is provided with a regulating valve 96 to control the amount of suction in the chamber 91. The compression chamber 92 of the head 90 is connected by a pipe 97 with the pipe 64 previously mentioned, and this pipe 97 is provided with a regulating valve 98 to control the force of the blast in the chamber 92 and the chamber 75 registering with the chamber 92 at a time to force the articles off the transferring drum onto an endless conveyer belt 100 extending under the drum 70, as plainly indicated in Figs. 1, 2 and 3.

The endless conveyer belt 100 passes around a roller 101 journaled on the main frame 19 immediately below the path of the drum 70. In order to sustain the upper run of the conveyer belt 100 a distance ahead of the point of delivery of the articles, use is made of a supporting roller 102 extending across the under side of the upper run of the conveyer belt. The supporting roller is journaled in suitable bracket arms 103 attached to the main frame 19. The head 90 is provided with spokes 104 connected with a hub 105 through which extends loosely the shaft 76 so as to hold the head centrally in position on the end of the drum 70.

In order to permit an accurate adjustment of the drums 16 and 70 one relatively to the other with a view to cause the cup-shaped cells 28 to properly register with the depressions 73, use is made of a disk 110 secured centrally to the front end of the shaft 17 and provided with segmental slots 111 through which extend bolts 112 engaging the spokes or web of the gear wheel 78. The disk 110 is provided with an arm 113 provided on opposite sides with screws 114 and 115 engaging opposite sides of one of the spokes of the gear wheel 78 to cause the gear wheel 78 to rotate the shaft 17 when rotated by the gear wheel 77, it being understood that the gear wheel 78 is loose on the shaft 17. On loosening the bolts 112 and turning the screw rods 114 and 115, the shaft 17 can be turned forwardly or backwardly and independently of the gear wheels 78 and 77 to cause the cells 28 to accurately register with the depressions 73, after which the bolts 112 are screwed up to securely fasten the disk 110 to the gear wheel 78.

The operation is as follows: When the machine is running the vat 10 is constantly supplied with pulp by way of the pipe 11 and the drums 16 and 70 rotate in unison, and at the same time suction is produced in the chambers 41, 42, 43 and 91, and compression is had in the chambers 44 and 92. The rotation of the molding drum 16 causes the lower portion thereof to pass through the pulp in the vat 10 and owing to the suction in the chambers 21 lowermost at the time the pulp is drawn onto the outer faces of the molds 25 and 26, the thickness of the layer depending on the amount of suction in the chamber 41 and the speed of the drum 16 which latter is predetermined and practically constant, while the suction in the chamber 41 can be increased or diminished by adjusting the valve 57 correspondingly. The water drawn into the head chamber 41 from any one drum chamber 21 in register at the time with the said chamber 41 readily flows by its own gravity to the bottom of the chamber 41 and into the pipe 53, thus dispensing with lifting the water and insuring a quick disposal of the water with a comparatively small expenditure of power. By gradually reducing each chamber 21 in size from one end to the other, as indicated in Fig. 6, the suction action is uniform throughout the entire width of the corresponding section of a mold and hence a product of uniform thickness is the result. It will be noticed that the boundary of the layer of pulp on each mold 25, 26 is governed by the corresponding strips 30 and 31 so that a single article is formed on each mold 25, 26, each article having a number of cells corresponding to the number of cells 28 on the corresponding mold 25 or 26. The drum 16 during its rotary motion gradually carries the molded article out of the pulp in the vat 10, and then this article is subjected to a light suction action by way of the corresponding chambers 21 and the suction chamber 42 to hold the green article in position on its mold without danger of being disrupted or distorted, at the same time some of the moisture in the article is drawn out of the same by the said suction action. During the further rotation of the drum 16 the article is carried above the horizontal center plane of the drum 16 and now the article is subjected to a heavy suction action by way of the chambers 21 in communication with the suction chamber 43 by way of the port 48. During the time that the drum carries the article around over the top most of the moisture contained in the article is drawn out by the heavy suction action and consequently the pulp is very thoroughly compacted and deprived of most of its moisture, and mechanical compression of the article is not necessary. By reference to Fig. 6 it will be noticed that when a chamber 21 reaches an uppermost position it is quickly drained of all its moisture owing to the inclined bottom 22 down which the liquid flows to and through the port 48 into the chamber 43. It will be noticed that the water passing through the port 48 into the chamber 43 readily flows by its own gravity to the bottom of the chamber 43 and to the pipe 60 to be carried off with the water from the chambers 41 and 42 to a suitable place of discharge by the action of the pump 56. The chambers 21 of the drum 16 move next in succession into register with the compression chamber 44 so that blasts of air pass from this chamber 44 through the perforations in the drum plate 20 and through the perforations in the corresponding mold 25 or 26 against the back of the article to force the article gradually off the mold and onto the plates 71 with the cup-shaped cells of the articles gradually passing into the depressions 73. By having each chamber 21 gradually reduced in size from one end to the other, as indicated in Fig. 6, the air pressure is equally distributed in the chamber and a like pressure is exerted against the under side of the corresponding portion of the article at the time the chamber moves into register with the port 49 of the chamber 44 so that the corresponding portion of the article is uniformly forced off the corresponding portion of the mold and hence a portion of the article is not liable to stick to the mold and be fractured. It will further be noticed that at this time the corresponding chambers 75 of the drum 70 are in register with the suction chamber 91 by way of the port 93 so that a suction action is had in said chamber to draw the corresponding portion of the article onto the peripheral face of transferring drum 70. Thus at the point of transfer of the article from the molding drum 16 to the transferring drum 70 a uniform blasting action is had against the back of the article on the drum 16 and a uniform suction action is had on the transfer point of the drum 70 to insure a gradual transferring of the article from the drum 16 onto the transferring drum 70. The article adheres to the plates 71 of the drum 70 during the latter's rotation from the chamber 91 to the chamber 92 and then each article is forced gradually off the corresponding plate 71 by the air blasts passing from the chamber 92 by way of the port 94 into the corresponding chamber 75 in register with the port 94 at the time. The article gradually blown off from the drum 70 drops onto the upper run of the conveyer belt 100, the surface speed of which is approximately the same as that of the peripheral face of the drum 70. The conveyer belt 100 carries the articles through a suitable drying apparatus for depriving the remaining portions of the articles of their moisture.

By the arrangement described, the paper pulp in suspension in the pulpy mass is drawn against the molds 25 and 26 to form a deposit of a uniform thickness which latter can be increased or diminished by more or less opening or closing of the valve 57. The pulp article produced still contains a large amount of water and hence is very soft and when emerging out of the pulpy mass is liable to crumble up and drop back into the vat to be disrupted or distorted, but this is prevented by the use of the light suction action in the chamber 42, as previously explained. When the article in its upward travel with the drum 16 has passed the horizontal central plane of the drum it is subjected to a heavy suction action by way of the chamber 43 to deprive the article of most of the remaining portion of the moisture at the same time compacting the pulp to such a degree that further compacting by mechanical means is not required. It will be noticed that the article is subjected to heavy suction during its upward travel with the drum until it passes beyond the top of the drum. Thus a heavy suction action is maintained for a considerable length of time on the article to deprive the latter of most of its moisture, the article being then sufficiently dry and compacted to permit its safe transferring to the transferring drum 70, as above explained. It will further be noticed that each article is subjected to continuous blasts of air as the corresponding chambers 21 move in unison with the chamber 44 whereby the article is gradually lifted off the molds without danger of distortion or breaking, and in a like manner the article is gradually sucked onto the plates 71 of the transferring drum 70 and gradually blown off the latter onto the endless belt 100. It will further be noticed that by the arrangement described two fillers $a$ and $b$, such as shown in Figs. 10 and 11, of the same size but with different numbers of cells are produced.

By producing uniform suction action and uniform air blasts in the chambers 21, as above explained, the machine can be run at a high rate of speed and with an expenditure of comparatively little power, the article is properly formed and compacted and deprived of a considerable amount of its moisture, at the same time the water is carried off quickly and the articles are safely removed from the molding drum onto the transferring drum and delivered by the latter to the endless belt.

Having thus described our invention, we claim as new and desire to secure by Letters Patent:

1. A machine for making articles from pulp, comprising a pulp vat adapted to contain pulp in suspension, a continually rotating drum extending with its lower portion into the said pulp and provided on its peripheral face with perforate molds, suction means for producing a suction action on the backs of the molds as the latter pass through the pulp to draw the latter onto the molds and compact the pulp thereon, a light suction means on the backs of the molds immediately after they have passed out of the pulp to hold the articles in position on the molds until the molds and articles have passed a horizontal central position of the drum, a heavy suction means producing a suction action on the molds while the latter pass up one side and over the top of the drum to deprive the articles on the molds of some of their moisture, and means for directing blasts of air against the under side of the molds to gradually force each article off its mold.

2. A machine for making molded articles from pulp comprising a pulp vat, a revoluble molding drum extending with its lower portion into the pulp contained in the pulp vat, the said molding drum being provided on its peripheral face with perforate molds and the said molding drum being provided with chambers in communication with the under sides of the said molds, a transferring drum revolving in unison with the said molding drum and provided on its peripheral face with perforate receiving plates and with chambers in communication with the receiving plates, the said molds on the molding drum having perforate raised portions and the plates on the transferring drum having perforate depressions adapted to register with the raised mold portions, fixed heads on the ends of the said drums and having air suction chambers and compressed air chambers adapted to register with the said drum chambers, the chambers being arranged relatively to each other to suck the pulp onto the molds of the molding drum and thereby form the article and deprive the same of a large portion of its moisture, to force the molded article off the molds onto the plates of the transferring drum and to finally force the molded article by compressed air off the said plates of the transferring drum.

3. A machine for making molded articles from pulp, comprising a pulp vat, a revoluble molding drum extending with its lower portion into the said pulp vat and provided on its peripheral face with spaced perforate molds having raised portions, the said molding drum being provided with chambers of which a plurality are in communication with the under sides of a corresponding mold, a transferring drum revolving in unison with the said molding drum and provided on its peripheral face with perforate receiving plates having perforate depressions for receiving said raised portions of the molds, the said transferring drum having chambers of which a plurality are in communication with the under side of a corresponding plate, a fixed head for one end of the said revolving molding drum and having suction chambers in communication with a plurality of the said chambers on the molding drum, the said fixed head having a pressure chamber adapted to register singly with a chamber of the said molding drum, the said chambers being so arranged relatively to each other that the pulp in the vat is drawn onto the said molds and deprived of a large portion of the moisture to form molded articles, the latter being forced by pressure from the said pressure chamber off the molds, and a fixed head for the said transferring drum and having a suction chamber in communication with one of the said transferring drum chambers and located directly opposite the said pressure chamber of the said other head, the said transferring drum head being provided with a pressure chamber adapted to register with the transferring drum chambers singly to direct successive blasts against each article to gradually force the same off the plates of the transferring drum.

4. A machine for making molded articles from pulp, comprising a pulp vat, a revoluble molding drum extending with its lower portion into the pulp contained in the pulp vat, the said molding drum being provided on its peripheral face with perforate molds and the said molding drum being provided with chambers in communication with the undersides of the said molds, a transferring drum revolving in unison with the said molding drum and provided on its peripheral face with perforate receiving plates and with chambers in communication with the said receiving plates, the said molds on the molding drum having perforate raised portions and the plates on the transferring drum having perforate depressions adapted to register with the raised mold portions, fixed heads on the ends of the said drums, the head on the molding drum having three separate suction chambers arranged in a circle and of which the lowermost one produces a suction in the lowermost chambers of the molding drum to suck the pulp onto the molds to form the articles and to deprive the same of some of the moisture, the next following suction chamber produces a light suction in the chambers of the molding drum to hold the green articles in position on the molds and against distortion, and the uppermost suction chamber produces a heavy suction action in the chambers of the molding drum to deprive the articles of more of their moisture, the said head on the molding drum being provided next to the said uppermost suction chamber and directly opposite the transferring drum with a compressed air chamber adapted to register singly with the drum chambers to force each article by a number of pressure actions off its mold onto a corresponding plate of the transferring drum, the head of the latter being provided directly opposite the transferring drum with a suction chamber for producing a suction singly in the chambers of the transferring drum and the said head of the transferring drum being provided with a compressed air chamber spaced from the said suction chamber for forcing the molded articles off the transferring drum.

5. A machine for making molded articles from pulp, comprising a pulp vat, a revoluble molding drum extending with its lower portion into the pulp in the said vat, the said molding drum being provided on its peripheral face with perforate molds and being provided with chambers in communication with the under side of the said molds, a fixed head on one end of the said molding drum and having separate suction chambers adapted to register successively with the said drum chambers, and means for producing varying suction pressures in the said suction chambers to suck the pulp onto the molds to form the articles and deprive the same of moisture, to hold each article in position on its mold and against distortion as it emerges out of the pulp in the vat and to finally subject the article to a heavy suction action for drawing off some of the remaining moisture in the article.

6. A machine for making molded articles from pulp, comprising a pulp vat, a revoluble molding drum extending with its lower portion into the pulp in the said vat, the said molding drum being provided on its peripheral face with perforate molds and being provided with chambers in communication with the under side of the said molds, a fixed head on one end of the said molding drum and having a bottom suction chamber, a top suction chamber and an intermediate suction chamber, the said suction chambers being adapted to register successively with the said drum chambers, the said intermediate suction chamber being comparatively short relatively to the said bottom and top suction chambers, means for producing a variable suction in the bottom chamber to suck the pulp onto the molds to form the article of any desired thickness and depriving the article of some of the moisture, means for producing a very light suction in the said intermediate chamber to hold the green article on the mold and against distortion while emerging from the vat, and means for producing a heavy suction in the uppermost suction chamber for depriving the article of some of the remaining moisture.

7. A machine for making molded articles from pulp, comprising a pulp vat, a revoluble molding drum extending with its lower portion into the pulp contained in the said vat, the drum being provided on its peripheral face with perforate spaced molds and being provided with chambers, a plurality of which are in communication with the under sides of the molds, bottom suction means for producing a suction action simultaneously in a plurality of the said drum chambers which are at the time below the level of the pulp in the vat to suck the pulp onto the molds to form the articles and deprive the same of some of the moisture, top suction means for producing a suction action simultaneously in a plurality of the drum chambers which are at the time above the level of the pulp in the vat to deprive the articles of some of the remaining portion of the moisture, and a fluid pressure means next to the said top suction means and connected singly with the drum chambers to force each formed article by successive blasts off the mold.

8. A machine for making molded articles from pulp, comprising a pulp vat, a revoluble molding drum extending with its lower portion into the pulp contained in the said vat, the drum being provided on its peripheral face with perforate spaced molds and being provided with chambers, a plurality of which are in communication with the under sides of the molds, bottom suction means for producing a suction action simultaneously in a plurality of the said drum chambers which are at the time below the level of the pulp in the vat to suck the pulp onto the molds to form the articles and deprive the same of some of the moisture, top suction means for producing a suction action simultaneously in a plurality of the drum chambers which are at the time above the level of the pulp in the vat to deprive the articles of some of the remaining portion of the moisture, a retaining suction means intermediate the said top and bottom suction means and connecting with the drum chambers at the time they pass out of the pulp in the vat to hold the formed green articles on the molds against distortion, and a fluid pressure means next to the said top suction means and connected singly with the drum chambers to force each formed article by successive blasts off the mold.

9. A machine for making molded articles from pulp, comprising a pulp vat, a revoluble drum extending with its lower portion into the pulp contained in the said vat, the drum being provided on its peripheral face with perforate spaced molds and being provided with chambers, a plurality of which are in communication with the under sides of the molds, bottom suction means for producing a suction action simultaneously in a plurality of the said drum chambers which are at the time below the level of the pulp in the vat, to suck the pulp onto the molds to form the articles and deprive the same of some of the moisture, top suction means for producing a suction action simultaneously in a plurality of the drum chambers which are at the time above the level of the pulp in the vat to deprive the articles of some of the remaining portion of the moisture, a retaining suction means intermediate the said top and bottom suction means and connecting with the drum chambers at the time they pass out of the pulp in the vat to hold the formed green articles on the molds against distortion, a fluid pressure means next to the said top suction means and connected singly with the drum chambers to force each formed article by successive blasts off the mold, and an endless conveyer having its upper run in close proximity to the peripheral face of the said transferring drum and directly below the said pressure chamber to receive the said article as forced off the transferring drum, the said conveyer having a surface speed corresponding approximately to the peripheral face speed of the transferring drum.

10. A machine for making molded articles from pulp provided with a drum having peripheral chambers, and mold units secured to the drum and each overlying a plurality of suction chambers, each mold unit having a perforate rim plate, a perforate mold attached to the face of the rim plate and a non-perforate frame overlying the margin of a mold.

11. A machine for making molded articles from pulp, provided with a drum having peripheral chambers and mold units detachably secured to the drum and extending over the said suction chambers, each mold unit having a rim plate provided with large perforations, a mold foundation plate overlying and secured to the outer face of the rim plate, the foundation plate having minute perforations in register with the large perforations of the rim plate, and a frame formed of non-perforate strips overlying the margin of the foundation plate.

12. A machine for making molded articles from pulp provided with a revoluble molding drum having peripheral drum chambers covered with perforate molds, each chamber being gradually reduced in size from one end to the other, and a fixed head at the end of the drum having the large ends of the said drum chambers, the said head having a suction chamber and a compression chamber, the said drum chambers being adapted to register successively with the said suction and compression chambers during the rotation of the drum.

In testimony whereof we have signed our names to this specification in the presence of two subscribing witnesses.

FREDERIC PRUYN.
WILLIAM J. DE REAMER.

Witnesses:
   THEO. G. HOSTER,
   GEORGE H. EMSLIE.